United States Patent [19]
Abbott

[11] 3,868,623
[45] Feb. 25, 1975

[54] TOWABLE SONAR ARRAY WITH DEPTH COMPENSATION
[75] Inventor: Frank R. Abbott, San Diego, Calif.
[73] Assignee: The United States of America as represented by the Secretary of the Navy, Washington, D.C.
[22] Filed: Aug. 24, 1973
[21] Appl. No.: 391,198

[52] U.S. Cl. .......... 340/7 PC, 114/235 B, 340/8 PC
[51] Int. Cl. .............................................. G01v 1/16
[58] Field of Search ........ 340/7 PC, 7 R, 8 PC, 8 R, 340/3 T; 174/101.5; 114/235 B

[56] References Cited
UNITED STATES PATENTS

| 2,632,150 | 3/1953 | Silverman et al. | 340/7 PC |
| 2,791,757 | 5/1957 | Blake et al. | 340/7 R |
| 2,928,367 | 3/1960 | McCormick | 114/235 B |
| 3,108,247 | 10/1963 | Harris | 340/8 PC |
| 3,435,410 | 3/1969 | Babb | 340/7 PC |

Primary Examiner—Malcolm F. Hubler
Assistant Examiner—H. A. Birmiel
Attorney, Agent, or Firm—Richard S. Sciascia; Ervin F. Johnston; Thomas G. Keough

[57] ABSTRACT

A towed sonar array has a number of transducer elements carried within an elongate, compliant, gas-filled sleeve. A smaller, elongate, resilient tublet extends the length of the compliant sleeve and is filled with mercury to offset the buoyancy of the gas-filled sleeve. As the towed array is lowered deeper and deeper in the water, the compliant sleeve and resilient tublet begin to collapse. At maximum useable depth, the gas is displaced to the interior of the transducer elements and the mercury is squeezed into an externally carried, rigid reservoir. The towed array retains a neutrally buoyant characteristic to avoid the problems associated with excessive turbulence and flow noise, yet is much more sensitive than a fluid filled array.

8 Claims, 6 Drawing Figures

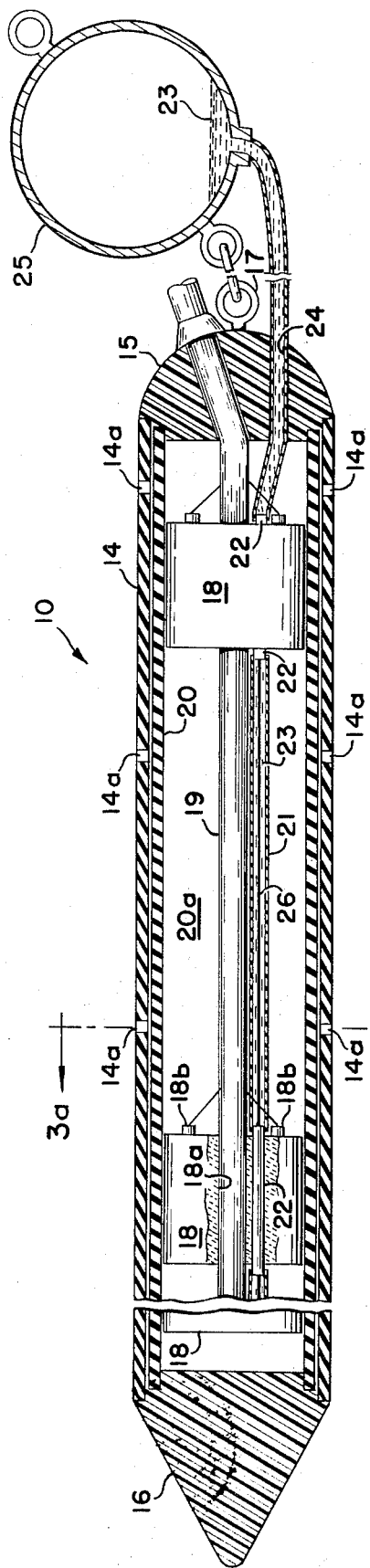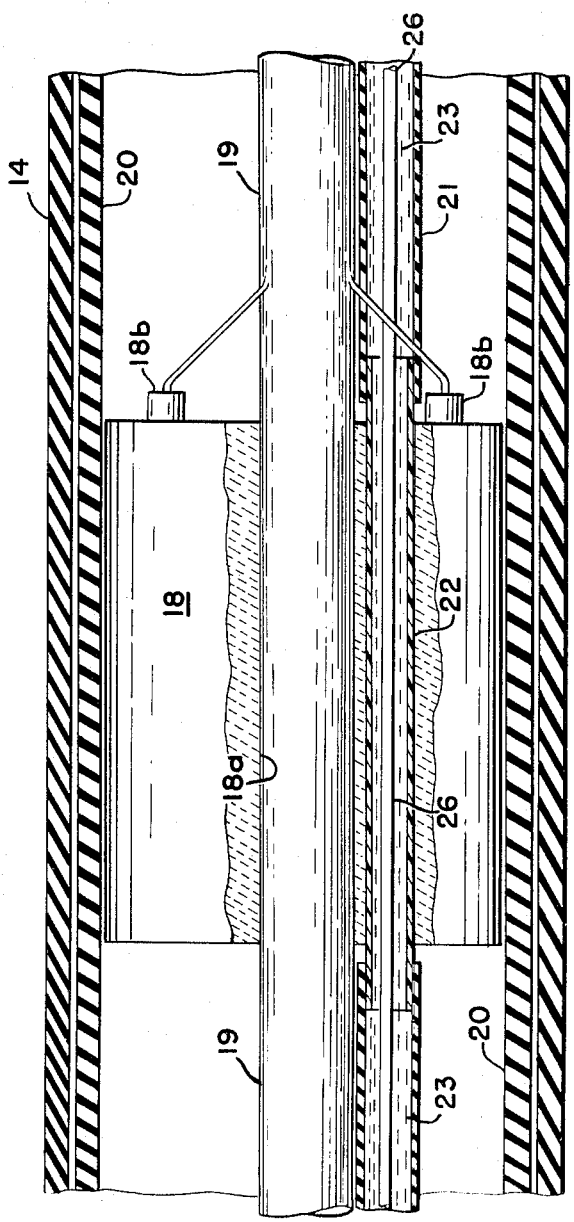
FIG.2a
FIG.2a'

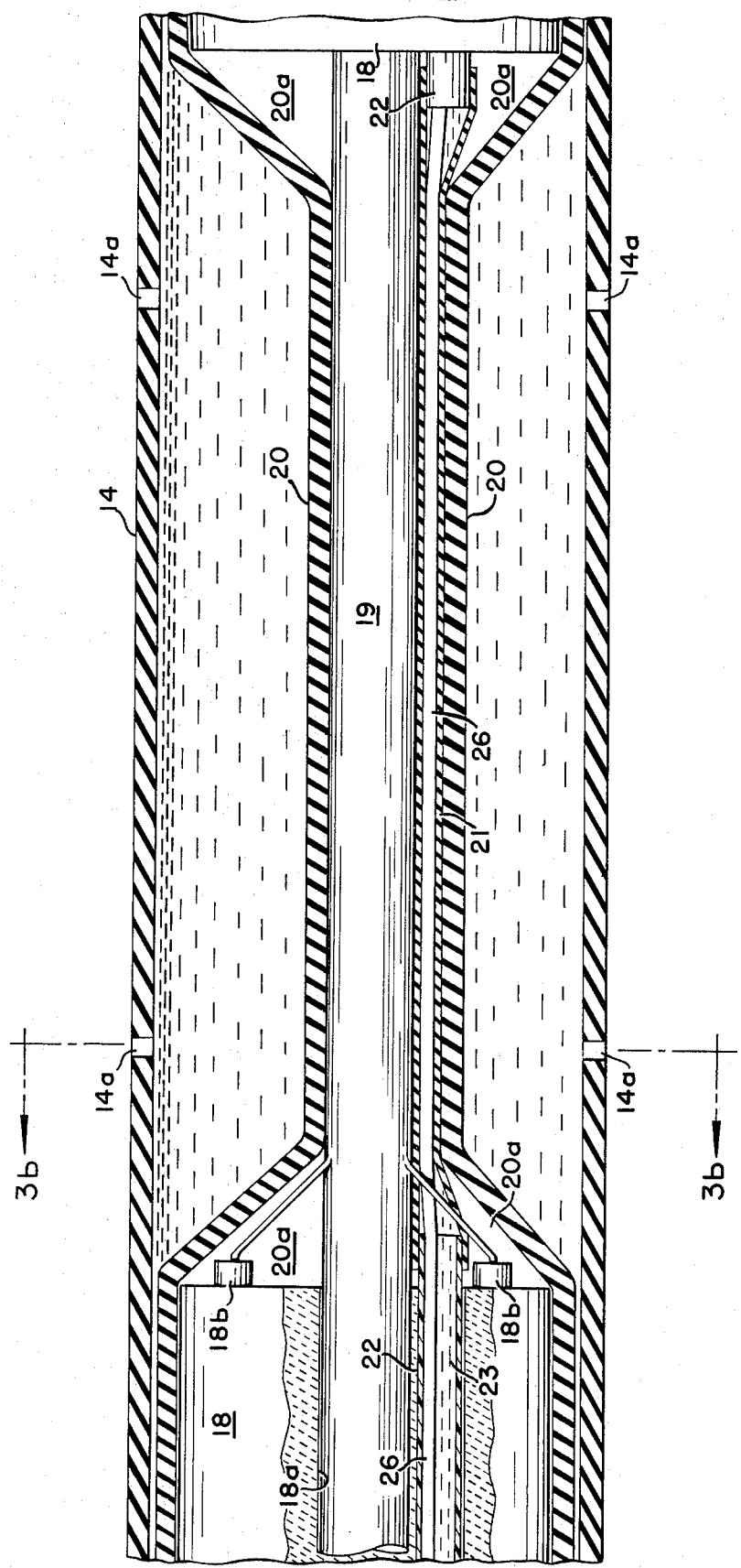

3,868,623

TOWABLE SONAR ARRAY WITH DEPTH COMPENSATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transducers of acoustic energy are many and varied in design. Seismic explorations and a variety of military applications caused the development of a so-called line array transducer which optionally functions in the active mode, passive mode, or a combination of both. The usual procedure relies on a surface ship towing a paravane device at a preset depth via a towing cable. Behind the paravane, a hose-like line array is played out a predetermined distance and electrical conductors pass signals back-and-forth between the ship and the array. Most arrays possess an inherent defect which inhibits satisfactory performance, particularly when they function in the passive mode. This defect resides in their inability to trail responsively. That is to say, the tail-end of the array usually does not lie in the same plane as the head of the array, due to inadequate, or the lack of, buoyancy compensation. Having the tail-end fall below or rise above the head of the array generates an excessive amount of turbulence and flow noise and seriously degrades the array's performance. Fluid-filled arrays fabricated with flotation elements along their length, have been designed and, since they are nearly neutrally buoyant, responsive trailing will result within predetermined operational depths. However, sensitivity is sacrificed employing fluid-filled transducers as compared to the gas-filled type. There is a continuing need in the state-of-the-art for a towed line array having the sensitivity of gas-filled transducers and which will trail responsively at different depths.

SUMMARY OF THE INVENTION

The present invention is directed to providing an essentially neutrally buoyant transducer of acoustic energy. An elongate sleeve encloses a gas-filled space and a plurality of transducer elements are disposed in the sleeve with each of their hollow interiors being in communication with the gas-filled space. A flexible tublet is enclosed in the elongate sleeve and is filled with a fluid having a density greater than the surrounding medium. The exact amount of the fluid contained in the flexible tublet is at a quantity sufficient to counteract the buoyancy provided by the gas-filled space. A rigid reservoir carried outside of the elongate sleeve is interconnected to the flexible tublet to maintain the proper quantity of the liquid in the tublet. As the elongate sleeve and the flexible tublet are compressed and expanded in response to ambient pressure changes fluid passes to and from the reservoir. Concurrently, the gas in the gas-filled space is fed to and evacuated from the hollow interiors of the transducer elements to ensure responsive pressure compensation of each transducer element within predetermined operational depths.

It is a prime object of the invention to provide an improved, towed, sonar array.

Another object of the invention is to provide a towed, line array incorporating gas-filled hydrophone elements of increased sensitivity.

Yet another object is to provide a towed, line array having automatic buoyant compensation to render it neutrally buoyant and capable of responsive trailing.

Still another object is to provide towed, line array transducer having both increased sensitivity by the inclusion of gas-filled transducer elements and neutral buoyancy by inclusion of automatic buoyancy compensation elements.

Still another object is to provide a sensitive, neutrally buoyant, towed, line array having an outer surface configured to reduce the problems associated with turbulance and flow noise.

A further object of the invention is to provide a towed, line array which employs liquid mercury to offset the buoyancy of a gas-filled elongate sleeve.

These and other objects of the invention will become more readily apparent from the ensuing description when taken with the drawings.

BRIEF DESCRIPTION OF THE DRAWINGS

FIG. 2a shows a cross-sectional view of the invention near the surface taken generally along lines 2—2 in FIG. 1.

FIG. 2a' is an enlarged view of a portion of the array.

FIG. 2b shows a cross-sectional view of a section of the invention at maximum useable depth taken generally along lines 2—2 in FIG. 1.

FIG. 3a shows a cross-sectional view of the invention near the surface, taken generally along lines 3a — 3a in FIG. 2a.

DESCRIPTION OF THE PREFERRED EMBODIMENT

Figure 1:
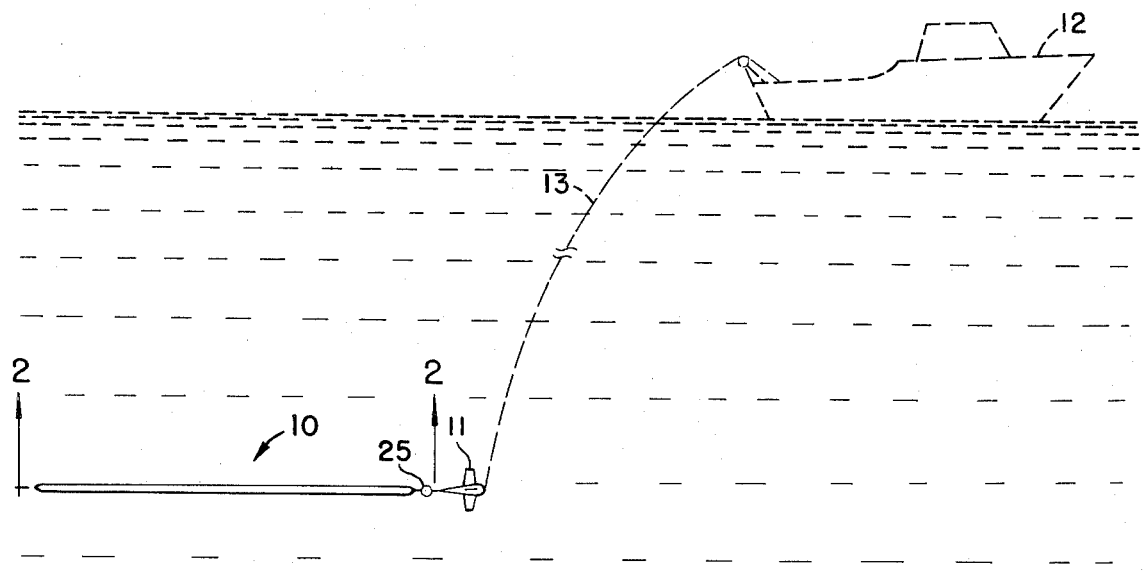
FIG. 1 shows the array towed by a paravane-like device.

Referring now to the drawings, FIG. 1 shows the invention, a line array sonar 10, trailing a paravane-like device 11 which is, in turn, pulled through the water by a ship 12 via an interconnecting cable 13. The configuration of the paravane and the cable are consistent with the accepted marine design criteria. Thus, the shape and form are such as to avoid flutter and excessive noise. Since the array may be towed at speeds in excess of a few knots, designs which avoid or reduce cavitation also should be considered. In any event, transducers of acoustic energy have been routinely deployed by this means in seismic and military operations along the surface or at depths in excess of 100 feet.

At first glance, some elements of the present invention appear to be rather conventional in design. An elongate protective sheath 14 is provided with a plurality of holes 14a, the purpose of which will be explained below. The outer surface of the protective sheet is free from proturbences and maintains a streamlined outer configuration to reduce the problems associated with flow noise and turbulance. The sheath is fashioned from a rubber-like material having a sufficient toughness to protect the other elements of the array from damage during deployment and retrieval, and it also has suitable properties for transmitting and receiving acoustic energy.

A cap member 15 and a cone-shaped tail member 16 are connected to opposite ends of the sheath and together they complete the exposed surfaces of the line array. Both members are rigid and, preferably, are molded or machined from stock which will resist the effects of the surrounding water. A pad eye 17 integrally extends from or is suitably connected to the cap member to function as a link between the array and the paravane.

Inside of the sheath a plurality of transducer elements 18 are tandemly arranged in a spaced relationship. Irrespective that the drawings show only a few transducer elements, it is to be understood that as few as two, or more than 50 elements are employed in a typical towed array within the scope of the invention. The exact number chosen and their type, i.e. gas-filled or fluid fitted, is determined by the job at hand.

The particular transducer element chosen for inclusion in the line array is not overly critical. Any of a number of transducers may be chosen which will convert radial displacements to representative electrical signals when functioning in the passive mode or project acoustic energy by reciprocal radial excursions in response to applied driving signals. Irrespective of the design chosen, the transducer element should fit snugly inside the protective sheath and have some sort of a longitudinal passageway for electrical conductors.

One highly satisfactory design for transducer element 18 is disclosed in the U.S. Pat. No. 3,718,897 entitled "High Fidelity Underwater Music Projector", issued to the present inventor, Frank R. Abbott, on Feb. 27, 1973. When this transducer functions in the active mode, appropriate driving signals impart axial excursions of a ferroelectric stack which are translated to radially displace circumferentially disposed outer surfaces. When operation in the passive mode is called for, impinging acoustic energy causes reciprocal radial displacements of the outer surfaces which are transferred to axial excursions and the generation of responsive signals. The hollow interior of the Abbott transducer is either liquid filled or gas-filled. The end cap members are either closed or open to define a longitudinal passageway.

In the present invention, the open-ended configuration is selected so that an axial passageway 18a runs the entire length of each transducer element. The axial passageway is chosen in the present case to serve a twofold purpose. First, it provides an opening through which the interior of the transducer element is pressure compensated by the gas-filled interior of the protective sheath and secondly, it serves as a passageway for a bundle of electrical conductors 19 electrically interconnecting successive ones of the transducer elements along the length of the array. For this purpose, each of the transducer elements has a pair of terminals 18b operatively interconnecting each transducer element to a remote control-monitor station.

To this point, if the holes in the elongate protective sheath are plugged or disregarded, what has been described is conventional and in general use. Obvious shortcomings are readily apparent. If the array was gas-filled, it would trail responsively only at one preset depth. Above this depth, the array would arc upwardly and when taken below this depth, the array would collapse and droop. The turbulence and flow noise created rendered them largely unacceptable. A fluid filled array which tended to trial more satisfactorily sacrificed sensitivity. Because of these two factors, there is a tendency to give line arrays a wide berth and to pursue other designs.

Automatic, continuous, pressure compensation to a predetermined maximum depth, is afforded by the novel provision of elements functionally cooperating to achieve this result. An elongate sleeve 20 is sized to fit inside protective sheath 14 and compliantly encloses a number of the aforedescribed transducer elements. The elongate sleeve is bonded or clamped at its opposite ends to cap member 15 and tail member 16 and defines the limits of a hollow, gas-filled interior 20a. The gas chosen, optionally, is air, although experience has demonstrated that some type of inert gas is preferable to reduce or inhibit corrosion among the elements contained in the sleeve.

A flexible tublet 21 reaches between adjacent transducer elements alongside the electrical conductors. A section of rigid tublet 22 optionally is included between lengths of the flexible tublet where the flexible tublet would otherwise pass through axial passageways 18a in the transducer elements. When a considerable number of transducer elements are in an array, the rigid tublets prevent the tublets being pinched by the bundle of electrical conductors. The flexible tublet has a stiffness which is slightly less than the stiffness of the elongate sleeve, for reasons to be stated below.

A liquid 23, having a density greater than the ambient medium fills the interior of the flexible tublet and rigid tublets, if desired. The purpose of the liquid is to partially offset buoyancy created by the gas-filled space in the interior of the elongate sleeve to render the array neutrally buoyant. In water, liquid mercury is a good candidate for offsetting the buoyancy of the gas-filled interior 20a. Irrespective of what liquid is used, the tublet must be sufficiently dimensioned to contain the proper amount of liquid for ensuring neutral buoyancy.

After a designer selects liquid mercury, the maximum cross-sectional area of flexible tublet 21 is dimensioned to be about 0.074 times the cross-sectional area of gas-filled space 20a. Because the density of water is 0.074 times the density of mercury, the amount of buoyancy produced by gas-filled interior 20a is offset by the amount of ballast provided by liquid 23 in flexible tublet 21.

Figure 3A:
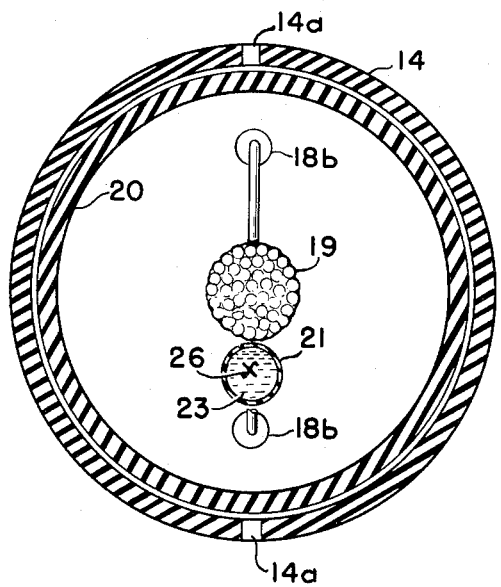
Figure 3B:
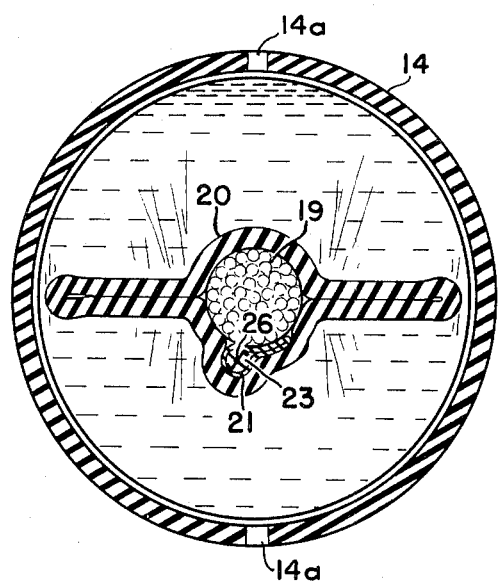
FIG. 3b shows a cross-sectional view of the invention taken generally along lines 3b — 3b in FIG. 2b.

FIGS. 2a and 3a depict an array at or very near the surface of a body of water where there is substantially no compression of elongate sleeve 20 and neutral buoyancy is assured by the balancing out of the buoying forces and the sinking forces. Since the liquid mercury and gas-filled interior 20a are bound in substantially the same proportions throughout the array, neutral buoyancy is assured per unit length. Normally, the gas-filled transducer elements of the type referred to above are nearly neutrally buoyant and need not rely on other flotation elements.

However, as paravane 11 is controlled to deploy the array at a deeper depth, the gas in gas-filled space 20a becomes compressed and elongate sleeve 20 partially collapses. Neutral buoyancy is assured by an externally reaching tublet duct 24 provided for bleeding off a portion of the excess mercury. The distal end of the tublet duct terminates in a reservoir 25 of heavy, metal, shell construction which is not affected by ambient pressure changes. The volume of gas in the reservoir cavity should be such that at maximum working depth to which the array is deployed, the compressed gas pressure will be just below the surrounding sea pressure (this occurs when elongate sleeve 20 nearly completely collapses, note FIG. 2b). In other words, if the gas space in axial passageways 18a is one-fiftieth of the gas space between adjacent transducer elements, then the remaining gas space in the reservoir cavity at full-tube-collapse-depth should be one-fiftieth of the initial gas volume of the elongate sleeve. At full collapse depth of elongate sleeve 20, all of the gas in gas-filled interior 20a is compressed into axial passageways 18a of the transducer element. Simultaneously, the mercury in flexible tublet 21 is squeezed out of the tube and into reservoir 25 via tublet duct 24. Since reservoir 25 is positioned at the proper depth by paravane 11, its relative increase or decrease in weight does not affect the array. Line array 10 retains its essentially neutrally buoyant characteristics throughout its length and it trails responsively behind paravane 11.

An elongate rod 26 having an irregular cross-sectional configuration is disposed inside flexible tublet 20. Without the rod the flexible tublet could be pinched shut and somewhere along the array, the trapped liquid mercury would weigh down the array. With the rod, however, even when elongate sleeve is in an extreme condition of collapse, crushing against the flexible tublet, the elongate rod will ensure the creation of a passageway for the mercury to travel to the reservoir.

Obviously, many modifications and variations of the present invention are possible in the light of the above teachings, and, it is therefore understood that within the scope of the disclosed inventive concept, the invention may be practiced otherwise than specifically described.

What is claimed is:

1. An essentially neutrally buoyant transducer of acoustic energy comprising:
   means for compliantly enclosing a gas-filled space;
   at least one transducer element carried in the compliantly enclosing means having a hollow interior in communication with said gas-filled space;
   means disposed in the compliantly enclosing means for resiliently containing a fluid having a density greater than the surrounding medium, said fluid present in quantities sufficient to counteract the buoyancy provided by said gas-filled space; and
   means disposed in the medium being connected to the compliantly enclosing means and coupled to the resiliently containing means for maintaining said fluid in said quantities as the compliantly enclosing means and the resiliently containing means are simultaneously compressed and expanded in response to ambient pressure changes, the gas in said gas-filled space is concurrently fed to and evacuated from said hollow interior in response to the compression and expansion of the compliantly enclosing means and the resiliently containing means thereby pressure compensating each said transducer element.

2. A transducer according to claim 1 in which the compliantly enclosing means is an elongate sleeve, said transducer element is cylindrically shaped and dimensioned to occupy the inner diameter of said elongate sleeve, there are provided a plurality of transducer elements longitudinally spaced in said elongate sleeve, the resiliently containing means is a flexible tublet longitudinally extending in said elongate sleeve, and the maintaining means is a rigid reservoir of said liquid.

3. A transducer according to claim 2 further including.
   an elongate rod having an irregular cross-sectional configuration disposed in said flexible tublet for preventing the total collapse thereof at increased depth and;
   a rigid tube reaching through each said transducer element interconnected to said flexible tublet to ensure the transfer of said liquid to and from said rigid reservoir.

4. A transducer according to claim 3 further including:
   means covering the compliantly enclosing means for protecting and streamlining said transducer, the protecting and streamlining means is provided with at least one hole to transmit said ambient pressure changes to said elongate sleeve and said flexible tublet.

5. A transducer according to claim 4 further including:
   a bundle of electrical leads carried in said elongate sleeve and coupled to said transducer elements.

6. A transducer according to claim 5 in which the protecting and streamlining means is an elongate sheath sized to contain said elongate sleeve and having a stiffness greater than said elongate sleeve to ensure protection from physical abuse and to prevent the generation of excessive turbulance and flow noise.

7. A transducer according to claim 6 further including:
   a nose cap and a tail cone respectively mounted on opposite ends of said elongate sheath and said elongate sleeve, said rigid reservoir is mounted on said nose cap.

8. A transducer according to claim 7 in which said liquid is mercury and said transducer elements and said electrical leads are selected from materials which have a reduced chemical reaction with mercury.

* * * * *